(12) United States Patent
Chung et al.

(10) Patent No.: US 7,893,836 B2
(45) Date of Patent: Feb. 22, 2011

(54) METHOD AND APPARATUS FOR AVOIDING COLLISION BETWEEN EACH OF RADIO FREQUENCY IDENTIFICATION READERS

(75) Inventors: Byunghyun Chung, Daejeon (KR); Hee Sook Mo, Daejeon (KR); Nae-Soo Kim, Daejeon (KR); Cheol Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 423 days.

(21) Appl. No.: 12/039,476

(22) Filed: Feb. 28, 2008

(65) Prior Publication Data

US 2009/0058612 A1    Mar. 5, 2009

(30) Foreign Application Priority Data

Aug. 29, 2007    (KR) .................. 10-2007-0087272

(51) Int. Cl.
G08B 13/14    (2006.01)
(52) U.S. Cl. ................... 340/572.1; 235/380; 340/10.1; 340/447; 455/67.13
(58) Field of Classification Search ....... 340/10.1–10.3, 340/825.21–825.51, 3.41–3.42, 572.1, 447; 455/67.13, 450, 501, 63.1, 41.1; 235/439, 235/380, 451; 713/164
See application file for complete search history.

(56) References Cited

U.S. PATENT DOCUMENTS

2005/0088284 A1    4/2005 Zai et al.

(Continued)

FOREIGN PATENT DOCUMENTS

KR    1020030051410 A1    6/2003

(Continued)

OTHER PUBLICATIONS

Harrison B. Chung et al., "An Advanced RFID System to Avoid Collision of RFID Reader, Using Channel Holder and Dual Sensitivities", Microwave and Optical Technology Letters/ vol. 49, No. 11, Nov. 2007, pp. 2643-2647.

*Primary Examiner*—Brent Swarthout
(74) *Attorney, Agent, or Firm*—Kile Park Goekjian Reed & McManus PLLC

(57) ABSTRACT

Provided are a method and an apparatus for avoiding a collision between each of radio frequency identification (RFID) readers. The method and the apparatus divide the RFID readers into first RFID readers and second RFID readers according to a maximum output level, and set first frequency channels for the first RFID readers and second frequency channels for the second RFID readers, set frequency channel disposition information for each of the first RFID readers, generate a channel holding signal in each of the first frequency channels, and if a frequency channel usage request or a frequency channel return request is received from one of the first RFID readers, stop generating or generate the channel holding signal in a frequency channel related to the frequency channel usage or return request. In this manner, the collision between each of the RFID readers is avoided by preventing the second RFID readers from using the first frequency channels for the first RFID readers. Also, the method and the apparatus can efficiently manage frequency channels by controlling a ratio of the number of the first frequency channels to be used by the first RFID readers and the number of the second frequency channels to be used by the second RFID readers, according to usage frequency.

25 Claims, 10 Drawing Sheets

U.S. PATENT DOCUMENTS

| | | |
|---|---|---|
| 2006/0076401 A1* | 4/2006 | Frerking ...................... 235/380 |
| 2006/0220793 A1* | 10/2006 | Park et al. .................. 340/10.3 |
| 2006/0279409 A1 | 12/2006 | Yang et al. |
| 2007/0001813 A1* | 1/2007 | Maguire et al. ............ 340/10.2 |
| 2007/0096876 A1 | 5/2007 | Bridgelall et al. |
| 2007/0139162 A1* | 6/2007 | Bandy et al. ............... 340/10.2 |

FOREIGN PATENT DOCUMENTS

KR    1020070034415 A1    3/2007

\* cited by examiner

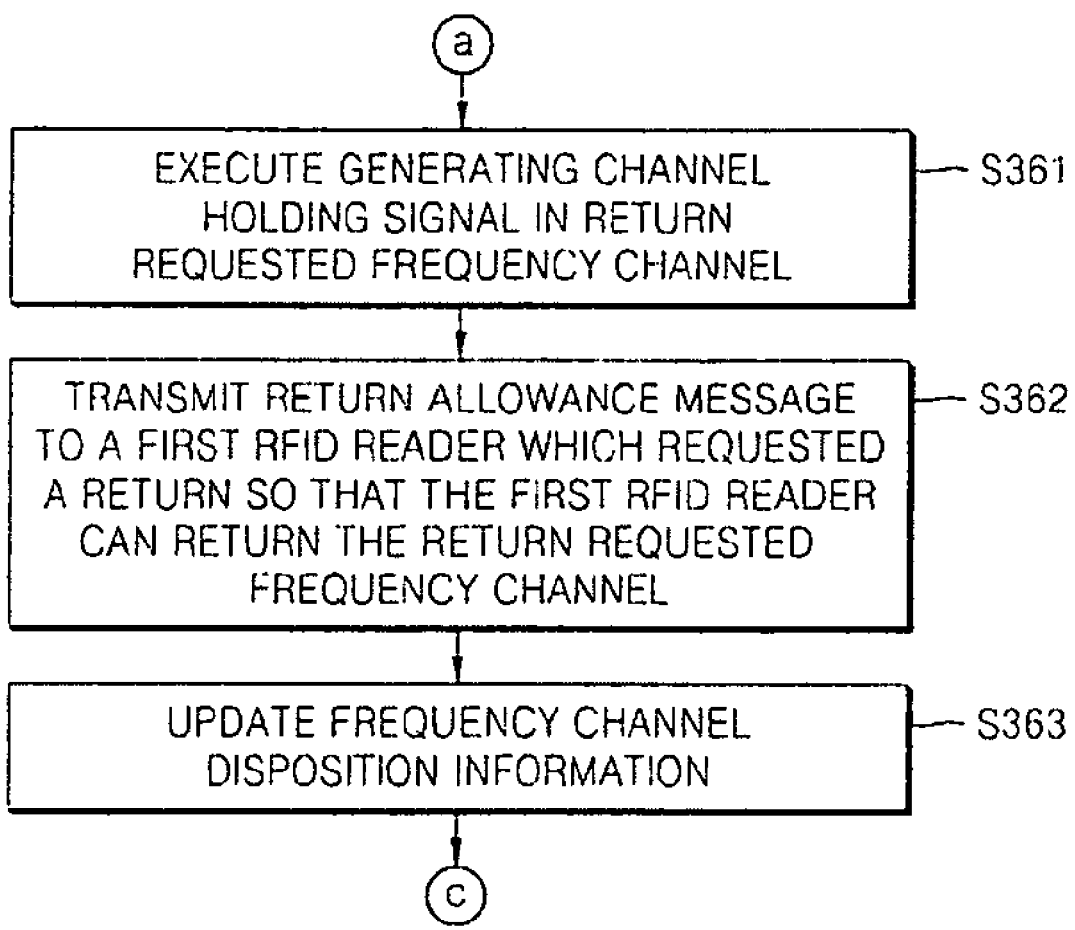

METHOD AND APPARATUS FOR AVOIDING COLLISION BETWEEN EACH OF RADIO FREQUENCY IDENTIFICATION READERS

CROSS-REFERENCE TO RELATED PATENT APPLICATION

This application claims the benefit of Korean Patent Application No. 10-2007-0087272, filed on Aug. 29, 2007, in the Korean Intellectual Property Office, the disclosure of which is incorporated herein in its entirety by reference.

BACKGROUND OF THE INVENTION

1. Field of the Invention

The present invention relates to a method and an apparatus for avoiding a collision between each of radio frequency identification (RFID) readers, and for primarily granting an important RFID reader a frequency channel usage right.

2. Description of the Related Art

A radio frequency identification (RFID) reader receives a response, which is related to a command transmitted from the RFID reader itself, from an RFID tag, thereby recognizing the RFID tag. At this point, in the case where a plurality of RFID readers, which adjacently exist, use the same frequency or in the case where a plurality of RFID readers simultaneously transmit a command to one RFID tag, the RFID readers can mutually cause an interference, and this phenomenon is called an RFID reader collision or a reader collision between each of the RFID readers.

The RFID market has been rapidly developed such that RFID readers and RFID tags are used in various fields. Thus, in the case where the RFID market is further developed such that many RFID readers are used in a limited space, if an item, which has an attached RFID tag to be read by an RFID reader, is not recognized by the RFID reader due to an RFID reader collision, then a severe problem can occur.

In U.S. Patent Publication No. 2005/0088284 A1, dated 28 Apr. 2005, entitled "Method and system of using an RFID reader network to provide a large operation area" (hereinafter, referred to as 'conventional invention'), a "Listen Before Talk" method is provided to avoid such RFID reader collision between each of the RFID readers. The "Listen Before Talk" method provides a method of synchronizing all of the RFID readers, so that the RFID readers simultaneously listen and talk. The "Listen Before Talk" method, according to the conventional invention, checks (Listen) whether a randomly selected frequency channel is used by an adjacent RFID reader, before an RFID reader reads an RFID tag. When a status of the randomly selected frequency channel is "Idle", the RFID reader reads (Talk) the RFID tag. When the status of the randomly selected frequency channel is not "Idle", the RFID reader randomly selects another frequency channel and repeats the aforementioned process. If all of frequency channels are in use, the RFID reader repeats the process in the next cycle.

The conventional invention synchronizes all RFID readers via an aerial wire interface such as an antenna. However, in the case where a mobile RFID reader or a handheld RFID reader, which does not have a synchronization function, is separately used, it is difficult to use them after synchronization. Also, in the case where RFID readers are used in a limited space, it is difficult to grant an important RFID reader priority of frequency channel usage.

Also, according to the conventional invention, a RFID reader wirelessly checks a channel used by an adjacent RFID reader, and thus, accuracy, in terms of the checking of whether the adjacent RFID reader uses a frequency channel, is degraded.

Therefore, it is necessary to divide the RFID readers according to types of the RFID readers, to set frequency channels to be used by the divided RFID readers, and to prevent RFID readers of other types from using the set frequency channels.

SUMMARY OF THE INVENTION

The present invention provides a method and an apparatus for avoiding a collision between each of radio frequency identification (RFID) readers that are divided according to an output.

The present invention also provides a method of controlling a ratio of the number of frequency channels respectively allocated to first and second RFID readers that are divided according to an output.

According to an aspect of the present invention, there is provided a method of avoiding a collision between each of RFID readers communicating with a RFID tag via limited frequency channels, performed by an apparatus for avoiding a collision between each of RFID readers, the method including the operations of dividing the RFID readers into first RFID readers and second RFID readers according to a maximum output level, and setting first frequency channels to be used by the first RFID readers and second frequency channels to be used by the second RFID readers; setting frequency channel disposition information, which allocates one or more available frequency channels from among the first frequency channels to each of the first RFID readers; generating a channel holding signal, which limits a usage by the second RFID readers, in each of the first frequency channels; stopping a generation of the channel holding signal in a selected frequency channel based on the frequency channel disposition information when a frequency channel usage request is received from one of the first RFID readers; and generating the channel holding signal in a return requested frequency channel when a frequency channel return request is received from one of the first RFID readers.

According to another aspect of the present invention, there is provided an apparatus for avoiding a collision between each of RFID readers communicating with a RFID tag via limited frequency channels, the apparatus including a channel control unit and a channel holding unit, wherein the channel control unit includes a management information unit dividing the RFID readers into first RFID readers and second RFID readers according to a maximum output level, setting first frequency channels to be used by the first RFID readers and second frequency channels to be used by the second RFID readers, and setting frequency channel disposition information, which allocates one or more of the available frequency channels from among the first frequency channels to each of the first RFID readers; an OFF control unit transmitting an OFF control signal for stopping generation of a channel holding signal in a selected frequency channel, based on the frequency channel disposition information, when a frequency channel usage request is received from one of the first RFID readers; and an ON control unit transmitting an ON control signal for generating the channel holding signal in a return requested frequency channel when a frequency channel return request is received from one of the first RFID readers, and wherein the channel holding unit generates the channel holding signal in each of the first frequency channels when the frequency channel disposition information is generated, and stops or generates the channel holding signal, based on a control signal received from the channel control unit.

According to another aspect of the present invention, there is provided a method of controlling a ratio of the number of first frequency channels and second frequency channels which are respectively to be used by first RFID readers and second RFID readers that are divided from RFID readers according to a maximum output level, performed by an apparatus for avoiding a collision between each of RFID readers communicating with a RFID tag via limited frequency channels, the method including the operations of setting initial parameter values comprising a ratio of the number of the first frequency channels and the number of the second frequency channels; and adjusting the number of the first frequency channels and the number of the second frequency channels based on a usage ratio of the first frequency channels and a usage ratio of the second frequency channels, wherein the usage ratio of the first frequency channels is a ratio of the number of the first frequency channels to the number of frequency channels actually used by the first RFID readers, and the usage ratio of the second frequency channels is a ratio of the number of the second frequency channels to the number of frequency channels actually used by the second RFID readers.

In this manner, avoidance of a collision between each of the RFID readers and efficient management of the frequency channels are achieved by preventing the second RFID readers from using the frequency channels for the first RFID readers.

BRIEF DESCRIPTION OF THE DRAWINGS

The above and other features and advantages of the present invention will become more apparent by describing in detail exemplary embodiments thereof with reference to the attached drawings in which:

FIG. 3C is a detailed flowchart of an ON operation from among operations of the method of FIG. 3A;

DETAILED DESCRIPTION OF THE INVENTION

Figure 1A:
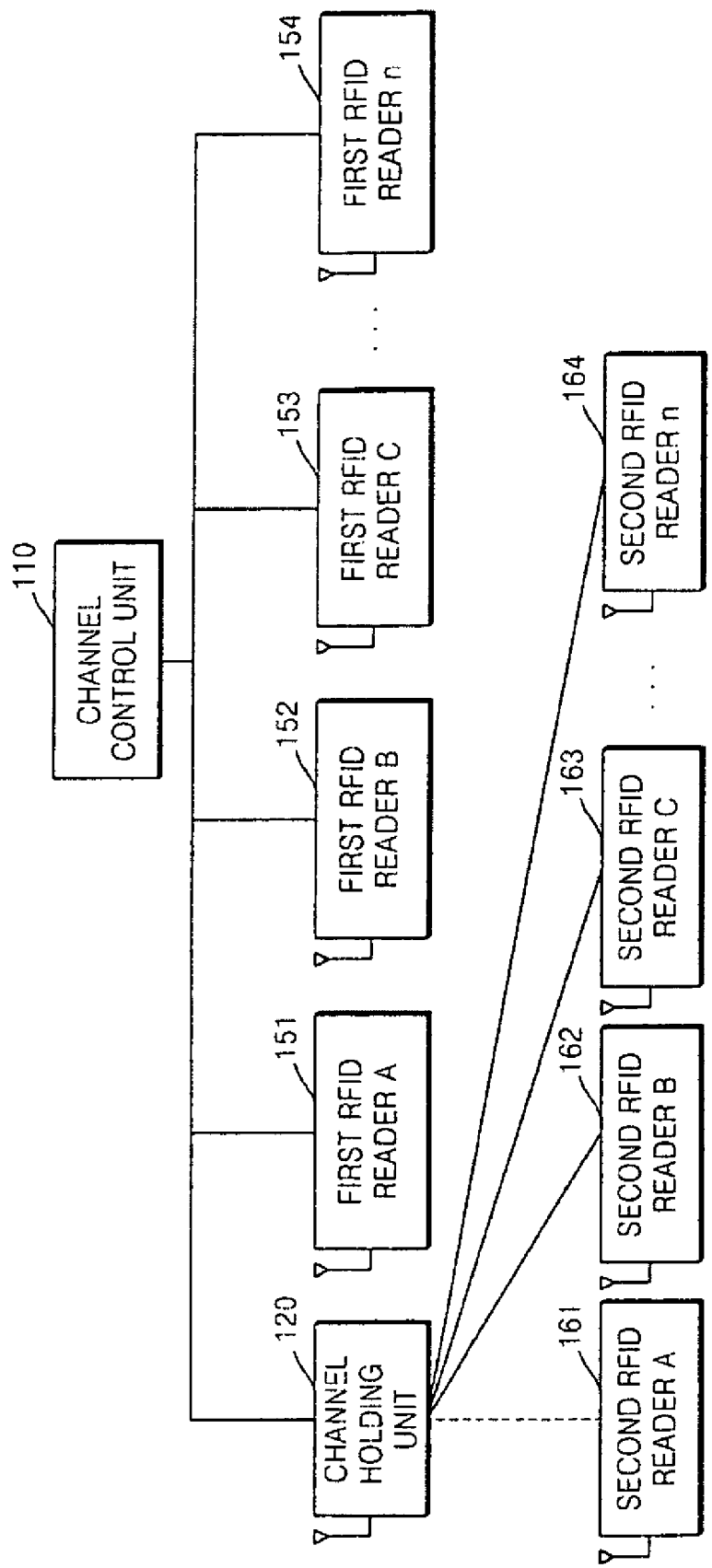
FIG. 1A is a block diagram illustrating an example in which an apparatus, for avoiding a collision between each of radio frequency identification (RFID) readers, is wired/wireless-connected to RFID readers in a wire/wireless form, according to an embodiment of the present invention.

A method and an apparatus for avoiding a collision between each of radio frequency identification (RFID) readers that are divided according to an output, and a method of controlling a ratio of frequency channels respectively allocated to first and second RFID readers which are divided according to an output, according to the present invention will now be described more fully with reference to the accompanying drawings, in which exemplary embodiments of the invention are shown. Like reference numerals in the drawings denote like elements.

FIG. 1A is a block diagram illustrating an example in which an apparatus, for avoiding a collision between each RFID reader, is wire/wireless-connected to RFID readers, according to an embodiment of the present invention.

Referring to FIG. 1A, the apparatus, for avoiding a collision between each of the RFID readers according to the current embodiment of the present invention, includes a channel control unit 110 and a channel holding unit 120. The apparatus, for avoiding a collision between each of the RFID readers, is wire-connected to first RFID readers 151, 152, 153, and 154, and is wireless-connected to second RFID readers 161, 162, 163, and 164 via an aerial wire interface such as an antenna. The channel control unit 110 divides the RFID readers into the first RFID readers 151, 152, 153, and 154, and the second RFID readers 161, 162, 163, and 164, according to a maximum output level. The channel control unit 110 allocates frequency channels, which are to be used by the first RFID readers 151, 152, 153, and 154, to the first RFID readers 151, 152, 153, and 154, and controls frequency channels to be used by the second RFID readers 161, 162, 163, and 164, using the channel holding unit 120. The channel holding unit 120 turns an output of a channel holding signal ON/OFF in a determined frequency channel, thereby holding or releasing the frequency channel, respectively.

Unlike the conventional invention, the first RFID readers 151, 152, 153, and 154 are wire-connected to the channel control unit 110, as illustrated in FIG. 1A, so that each of the first RFID readers 151, 152, 153, and 154 may accurately recognize a frequency channel used by an adjacent first RFID reader from among the first RFID readers 151, 152, 153, and 154, by using frequency channel disposition information, as described later, of the channel control unit 110.

Here, the first RFID readers 151, 152, 153, and 154 may be a general type RFID reader of which a position is fixed. The general type RFID reader represents an RFID reader that is fixed at a support in a portal or a conveyor and therefore is used. Such a general type RFID reader may receive data from a personal computer (PC) or transmit data to the PC through a Transmission Control Protocol/Internet Protocol (TCP/IP) interface. That is, in the case where the channel control unit 110 is embodied as a device such as a computer, the general type RFID reader may receive data from the channel control unit 110 or transmit data to the channel control unit 110 via a wire, as illustrated in FIG. 1A, and may directly receive power from a nearby separate device.

Here, the second RFID readers 161, 162, 163, and 164 may be a mobile/handheld type RFID reader that is attached or inserted to a mobile device such as a mobile phone. It is difficult for the second RFID readers 161, 162, 163, and 164, corresponding to the mobile/handheld type RFID reader, to be directly connected to the channel control unit 110 but the second RFID readers 161, 162, 163, and 164 may be wireless-connected to the channel holding unit 120 of the apparatus, thereby receiving/transmitting data. Also, the mobile/handheld type RFID reader may show a result and a status of the data reception/transmission via a screen attached to the mobile/handheld type RFID reader, and may have an output lower in terms of power than that of the general type RFID reader, due to a service life of a battery of the mobile/handheld type RFID reader, wherein the battery functions as a power source.

The performances of the channel control unit 110 and the channel holding unit 120 are briefly described as follows.

The channel control unit 110 sets first frequency channels to be used by the first RFID readers 151, 152, 153, and 154, and second frequency channels to be used by the second RFID readers 161, 162, 163, and 164.

In this case, the channel holding unit 120 generates a channel holding signal in each of the first frequency channels to limit usage by the second RFID readers 161, 162, 163, and 164.

After that, the channel control unit 110 receives a usage request or a return request from the first RFID readers 151, 152, 153, and 154, and allows the usage request or the return request, so that one of the first RFID readers 151, 152, 153, and 154, which actually required the request, may use a new frequency channel or return a frequency channel in use. Here, 'return a frequency channel by an RFID reader' means that the RFID reader stops using the frequency channel, or that, in the case where the frequency channel has been on hold (that is, in order to use the frequency channel by the RFID reader itself, a dummy signal has been transmitted from the frequency channel, thereby preventing the frequency channel from being used by other RFID readers), the holding status is released.

Based on the usage request or the return request, the channel control unit 110 transmits an OFF control signal to the channel holding unit 120 so that generation of a channel holding signal is stopped in a frequency channel related to the usage request, or the channel control unit 110 transmits an ON control signal to the channel holding unit 120 so that a channel holding signal is generated in a frequency channel related to the return request.

A channel holding signal may be a dummy signal. In the case where such a channel holding signal is generated in a frequency channel, other RFID readers receive the generated channel holding signal, thereby recognizing that the frequency channel is in use or in hold. In this case, other RFID readers, particularly, the second RFID readers 161, 162, 163, and 164 do not use the frequency channel in which the channel holding signal is generated but use another frequency channel. By doing so, the present invention prevents the second RFID readers 161, 162, 163, and 164 from using the frequency channel in which the channel holding signal is generated.

The channel holding unit 120 receives such an OFF control signal or an ON control signal from the channel control unit 110, and based on the received control signal, the channel holding unit 120 stops generation or generates the channel holding signal in the frequency channel related to the usage request or the return request.

The channel holding unit 120 flickers the channel holding signal via the aerial wire interface such as the antenna, and all of the second RFID readers 161, 162, 163, and 164 may receive such a channel holding signal.

Figure 1B:
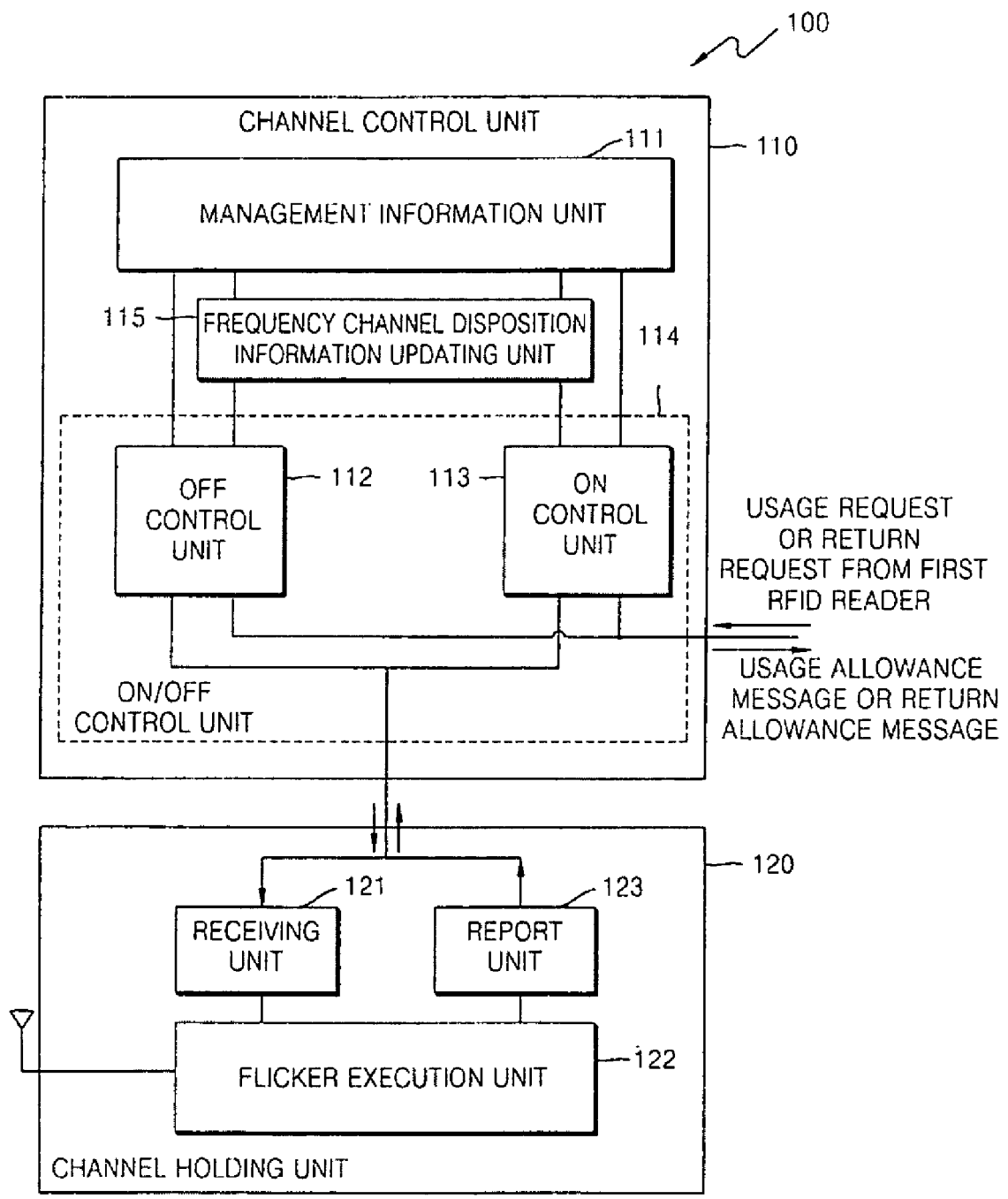
FIG. 1B is a block diagram illustrating a configuration of the apparatus, for avoiding a collision between each of the RFID readers, of FIG. 1A.

FIG. 1B is a block diagram illustrating a configuration of the apparatus, for avoiding a collision between each of the RFID readers, of FIG. 1A.

Referring to FIG. 1B, the block diagram illustrates a configuration of each of the channel control unit 110 and the channel holding unit 120 which are included in the apparatus for avoiding a collision between each of the RFID readers according to the present invention.

The channel control unit 110 includes a management information unit 111, an OFF control unit 112, an ON control unit 113, and a frequency channel disposition information updating unit 115.

The management information unit 111 divides the RFID readers 151, 152, 153, 154, 161, 162, 163, and 164 into the first RFID readers 151, 152, 153, and 154, and the second RFID readers 161, 162, 163, and 164, according to a maximum output level. The management information unit 111 sets first frequency channels to be used by the first RFID readers 151, 152, 153, and 154, and sets second frequency channels to be used by the second RFID readers 161, 162, 163, and 164. After that, the management information unit 111 sets frequency channel disposition information, which allocates at least one available frequency channel from among the first frequency channels to each of the first RFID readers 151, 152, 153, and 154, wherein the first frequency channels are a group of available frequency channels in the case where each of the first RFID readers 151, 152, 153, and 154 has to use a frequency channel.

Such frequency channel disposition information is generated by considering a frequency channel allocation plan by which frequency channels, which are separated from each other as far as possible, are allocated to the first RFID readers which are most adjacent to each other, so that a collision between each of the first RFID readers 151, 152, 153, and 154 is minimized.

The channel control unit 110 controls that the first RFID readers 151, 152, 153, and 154 use a frequency channel by using the frequency channel disposition information, thereby minimizing the interference between each of the first RFID readers 151, 152, 153, and 154.

In order to set the frequency channel disposition information, an installation position of the first RFID readers 151, 152, 153, and 154 is set, and then at least one available frequency channel from among the first frequency channels is allocated to each of the first RFID readers 151, 152, 153, and 154. Such frequency channel disposition information is stored in the management information unit 111, and is used at a later time by the OFF control unit 112 or the ON control unit 113.

The OFF control unit 112 and the ON control unit 113 are designated together as an ON/OFF control unit 114. The reason for denoting the ON/OFF control unit 114 is to explain that the OFF control unit 112 and the ON control unit 113 may be embodied as a singular entity in the case where the OFF control unit 112 and the ON control unit 113 are embodied as a part of an actual device or a system in the apparatus for avoiding a collision between each of the RFID readers.

When the OFF control unit 112 receives a frequency channel usage request from one (for example, the first RFID reader 153) of the first RFID readers 151, 152, 153, and 154, the OFF control unit 112 selects a frequency channel from among available frequency channels allocated to the first RFID reader 153, and which is not used by the first RFID readers 151, 152, 153, and 154, based on the frequency channel disposition information. Then, the OFF control unit 112 transmits an OFF control signal to the channel holding unit 120 so as to stop generating a channel holding signal in the selected frequency channel.

When the ON control unit 113 receives a frequency channel return request from one (for example, the first RFID reader 153) of the first RFID readers 151, 152, 153, and 154, the ON control unit 113 transmits an ON control signal to the channel holding unit 120 so as to generate a channel holding signal in a return requested frequency channel.

The frequency channel disposition information updating unit 115 updates the frequency channel disposition information by considering that a frequency channel is used when the channel control unit 110 receives the frequency channel usage request from one of the first RFID readers 151, 152, 153, and 154 and allows the one of the first RFID readers 151, 152, 153, and 154 to use the frequency channel, or the frequency channel disposition information updating unit 115 updates the frequency channel disposition information by considering that the return requested frequency channel is not used when the frequency channel return request is received from one of the first RFID readers 151, 152, 153, and 154.

That is, in the case where a status of a frequency channel is changed from an unused status to a used status according to a frequency channel usage request from a first RFID reader, if the frequency channel is allocated to some of the first RFID readers, allocation information may be deleted so that the some of the first RFID readers may not use the frequency channel. As an alternative method, instead of deleting the allocation information, it is possible to leave initial frequency channel disposition information unchanged and to add information (e.g., a flag), informing that the frequency channel cannot be used, to frequency channel disposition information related to the some of the first RFID readers which the frequency channel was allocated to.

Also, in the case where a status of a frequency channel is changed from a used status to a unused status according to a frequency channel return request from a first RFID reader, if some of the first RFID readers have the right to be allocated with the frequency channel (this may be checked by initial frequency channel disposition information), the frequency channel may be re-allocated to the some of the first RFID readers so that the some of the first RFID readers may use the frequency channel. As an alternative method, instead of such re-allocation, it is possible to leave the initial frequency channel disposition information unchanged and to add information (e.g., a flag), informing that the some of the first RFID readers may use the frequency channel, to frequency channel disposition information which is related to the some of the first RFID readers and which is from among the initial frequency channel disposition information.

The channel holding unit 120 includes a receiving unit 121, a flicker execution unit 122, and a report unit 123.

The receiving unit 121 receives the OFF control signal for stopping the generating of the channel holding signal from the OFF control unit 112, or receives the ON control signal, for generating the channel holding signal, from the ON control unit 113.

The flicker execution unit 122 executes stoppage of a generation of a channel holding signal or a generation of a channel holding signal, based on the control signal received by the receiving unit 121. That is, the flicker execution unit 122 turns a channel holding signal ON/OFF. The second RFID readers 161, 162, 163, and 164 may receive the generated channel holding signal via an antenna.

The report unit 123 reports a result of the execution to the channel control unit 110, wherein the execution is related to the stoppage of the generation of the channel holding signal or the generation of the channel holding signal as executed by the flicker execution unit 122. The report may be in the form of transmitting a message including that the channel holding signal is generated or the generation of the channel holding signal is stopped in a specific frequency channel.

Figure 1C:
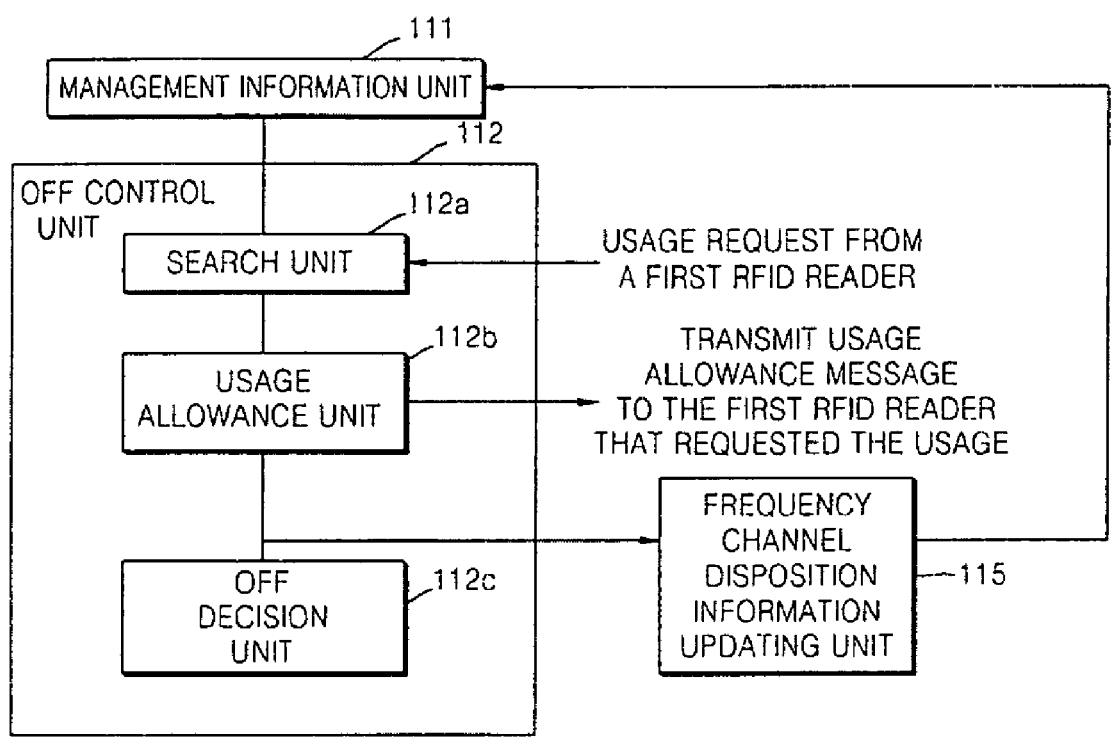
FIG. 1C is a detailed diagram illustrating an OFF control unit of FIG. 1B.

FIG. 1C is a detailed diagram illustrating the OFF control unit 112 of FIG. 1B.

Referring to FIG. 1C, the OFF control unit 112 includes a search unit 112a, a usage allowance unit 112b, and an OFF decision unit 112c. When the search unit 112a receives a frequency channel usage request from one of the first RFID readers 151, 152, 153, and 154, the search unit 112a searches for a non-used frequency channel from among one or more available frequency channels allocated to the one of the first RFID readers 151, 152, 153, and 154 that requested the usage, based on frequency channel disposition information. If the non-used frequency channel does not exist in the one or more available frequency channels allocated to the one of the first RFID readers 151, 152, 153, and 154 that requested the usage, the search unit 112a repeats the searching for the non-used frequency channel.

The usage allowance unit 112b transmits a usage allowance message to the one of the first RFID readers 151, 152, 153, and 154 that requested the usage so that the one of the first RFID readers 151, 152, 153, and 154 that requested the usage may use the found non-used frequency channel. When the one of the first RFID readers 151, 152, 153, and 154 that requested the usage receives the usage allowance message, the one of the first RFID readers 151, 152, 153, and 154 that requested the usage holds the found non-used frequency channel by transmitting a dummy signal in the found non-used frequency channel.

Since such a holding procedure is performed by the one of the first RFID readers 151, 152, 153, and 154 that requested the usage, the channel holding unit 120 does not need to maintain a channel holding signal in the found non-used frequency channel. That is, without a channel holding signal from the channel holding unit 120, the second RFID readers 161, 162, 163, and 164 cannot use the found non-used frequency channel due to the dummy signal transmitted from the one of the first RFID readers 151, 152, 153, and 154 that requested the usage.

Thus, the OFF decision unit 112c transmits an OFF control signal for stopping the generation of the channel holding signal in the found non-used frequency channel.

At this point, the frequency channel disposition information updating unit 115 accesses the management information unit 111, and updates frequency channel disposition information by considering that the found non-used frequency channel is used. That is, the frequency channel disposition information updating unit 115 updates the frequency channel disposition information by dynamically reconstructing the frequency channel disposition information or by changing flag information. The time when such an updating is performed may be predetermined by a user, and, as shown in FIG. 1C, the frequency channel disposition information updating unit 115 performs the updating after the usage allowance message is transmitted.

Figure 1D:
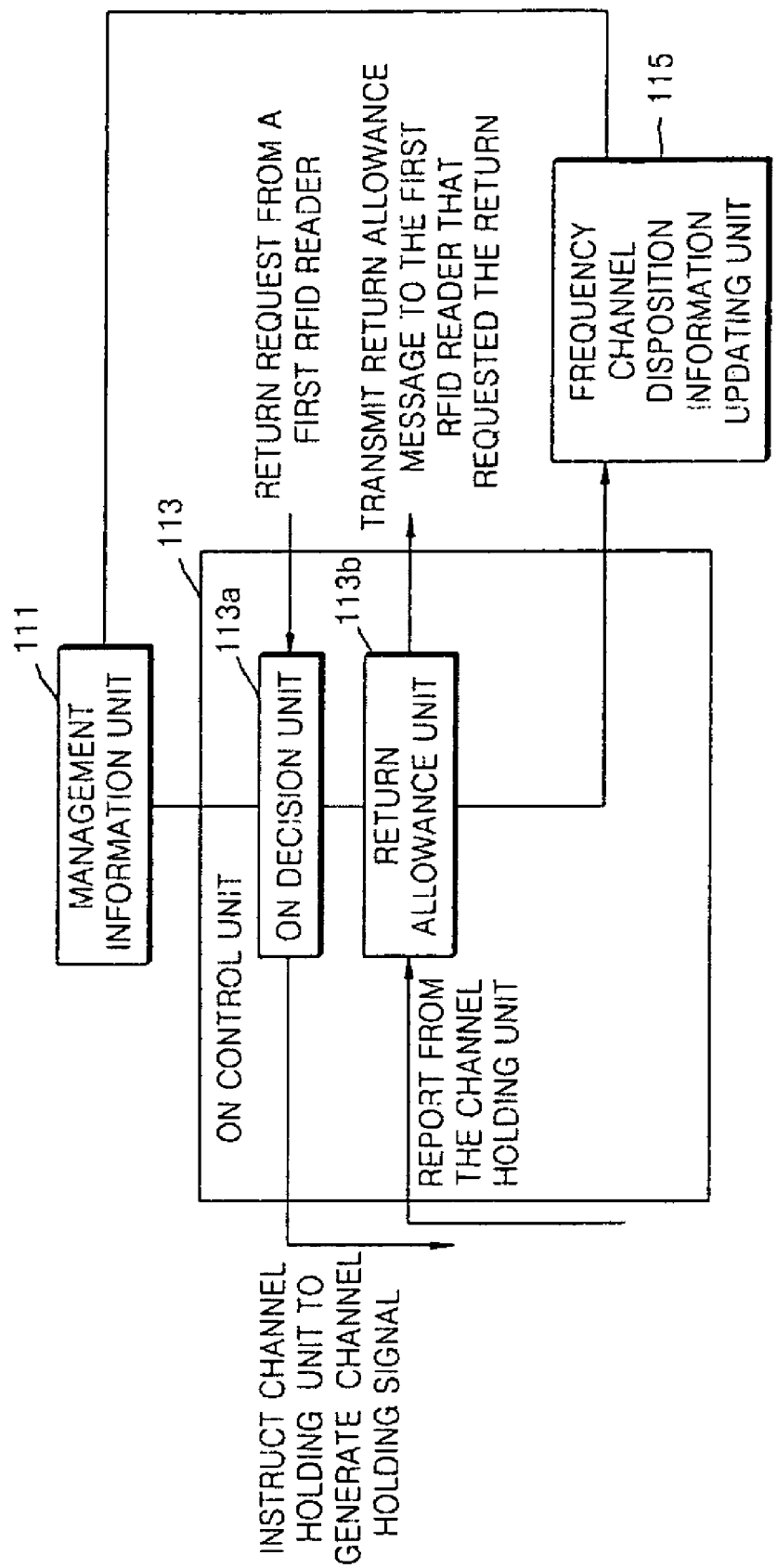
FIG. 1D is a detailed diagram illustrating an ON control unit of FIG. 1B.

FIG. 1D is a detailed diagram illustrating the ON control unit 113 of FIG. 1B.

Referring to FIG. 1D, the ON control unit 113 includes an ON decision unit 113a, and a return allowance unit 113b.

The ON decision unit 113a transmits an ON control signal for generating a channel holding signal in a return requested frequency channel when the ON decision unit 113a receives a frequency channel return request from the one of the first RFID readers 151, 152, 153, and 154.

The channel holding unit 120 receives the ON control signal and generates a channel holding signal based on the ON control signal, thereby transferring again a report, informing that the channel holding signal has been generated, to the return allowance unit 113b of the ON control unit 113.

In this manner, the channel holding signal is generated in the return requested frequency channel right after the frequency channel return request is required. Thus, from the time when the frequency channel return request is required to the time when the return requested frequency channel is actually returned, although any of the second RFID readers 161, 162, 163, and 164 attempt to use the return requested frequency channel, the channel holding signal may prevent the return requested frequency channel from being used. Also, after the return requested frequency channel is returned, the channel holding signal remains, therefore, the second RFID readers 161, 162, 163, and 164 cannot use the returned frequency channel. Thus, the return requested frequency channel is left for one of the first RFID readers 151, 152, 153, and 154 that may require a usage request at a later time.

The return allowance unit 113b receives the report and transmits a return allowance message to the one of the first RFID readers 151, 152, 153, and 154 that requested the return, thereby enabling the one of the first RFID readers 151, 152, 153, and 154 to return the return requested frequency channel. The one of the first RFID readers 151, 152, 153, and 154 that requested the return returns the return requested frequency channel when the return allowance message is received. That is, usage of the return requested frequency channel is stopped, or a channel holding status related to the return requested frequency channel is released.

Here, the frequency channel disposition information updating unit 115 accesses the management information unit 111 and updates frequency channel disposition information by considering that the return requested frequency channel is not used. That is, the frequency channel disposition information updating unit 115 updates the frequency channel disposition information by dynamically reconstructing the frequency channel disposition information or by changing flag information. The time when such an updating is performed may be predetermined by a user, and in FIG. 1D, the frequency channel disposition information updating unit 115 performs the updating during or after the transmittance of the return allowance message.

Figure 2:
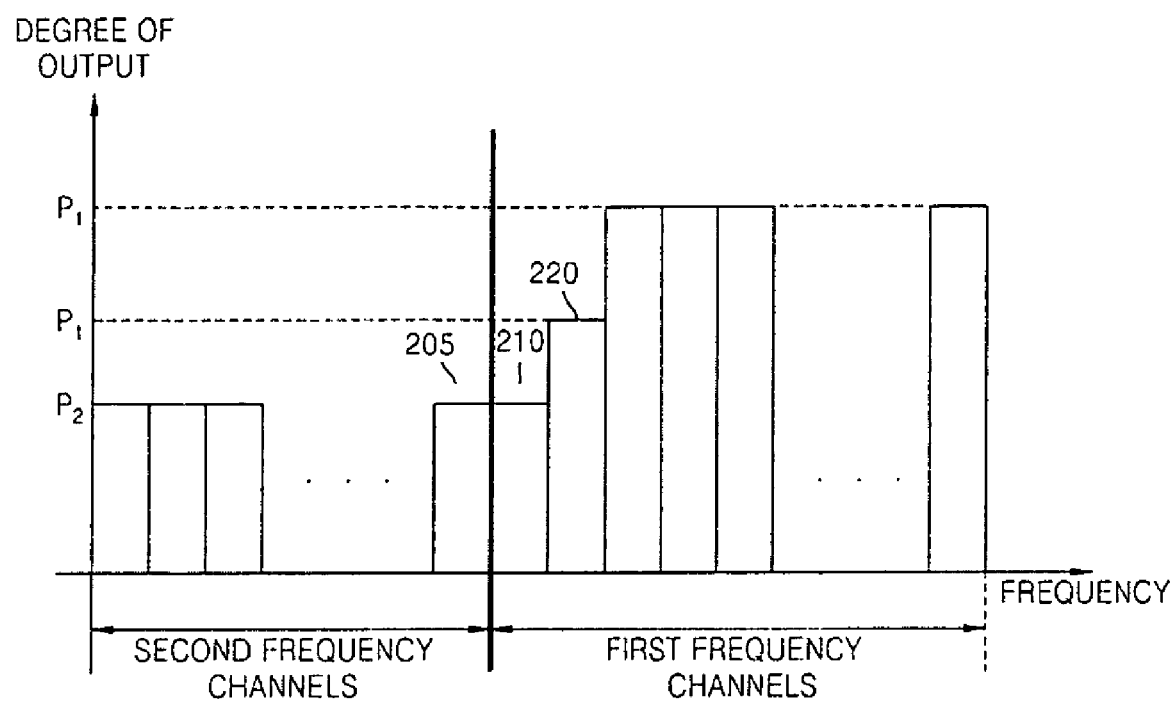
FIG. 2 is a graph illustrating a channel grouping for avoiding a collision between each RFID reader, according to an embodiment of the present invention.

FIG. 2 is a graph illustrating a channel grouping for avoiding a collision between each of the RFID readers, according to an embodiment of the present invention.

Referring to FIG. 2, in order to reduce interference between each of the first and second RFID readers 151, 152, 153, 154, 161, 162, 163, and 164, all of the frequency channels, as illustrated in a horizontal axis, are grouped into first frequency channels to be used by the first RFID readers 151, 152, 153, and 154, and second frequency channels to be used by the second RFID readers 161, 162, 163, and 164 such that all of the frequency channels are divided into the first frequency channels and the second frequency channels.

Here, the first RFID readers 151, 152, 153, and 154 are general type RFID readers. Since general type RFID readers have to read a far located RFID tag, thereby using a strong output. The second RFID readers 161, 162, 163, and 164 are mobile/handheld type RFID readers. Since mobile/handheld type RFID readers can approach and use an RFID tag, thereby using an output as much as needed. Mobile/handheld type RFID readers do not need to use an output equal to that of general type RFID readers, wherein the equal output may cause much interference with other RFID readers, or may reduce a service life of a battery of the mobile/handheld type RFID readers. Thus, mobile/handheld type RFID readers, that is, the second RFID readers 161, 162, 163, and 164 are set to have an output lower than that of the first RFID readers 151, 152, 153, and 154.

Hence, in FIG. 2, $P_1$, which is an maximum output of each of the first RFID readers 151, 152, 153, and 154, is greater than P2, which is an maximum output of each of the second RFID readers 161, 162, 163, and 164.

If a frequency channel, which is from among the first frequency channels and is most adjacent to the second frequency channels, is assumed to be called a first adjacent frequency channel 210, the first RFID readers 151, 152, 153, and 154, which can use the first adjacent frequency channel 210 based on frequency channel disposition information, include a variable attenuator and generate $P_2$ which is a maximum output of the second RFID readers 161, 162, 163, and 164, when the first RFID readers 151, 152, 153, and 154 use the first adjacent frequency channel 210.

If a frequency channel, which is from among the first frequency channels and is second-most adjacent to the second frequency channels, is assumed to be called a second adjacent frequency channel 220, the first RFID readers 151, 152, 153, and 154, which can use the second adjacent frequency channel 220 based on the frequency channel disposition information, generate $P_t$ which is a output value between the maximum output $P_2$ of the second RFID readers 161, 162, 163, and 164 and the maximum output $P_1$ of the first RFID readers 151, 152, 153, and 154.

The below-described example is related to a process for adjusting an output of the first RFID readers 151, 152, 153, and 154 which use the first and second adjacent frequency channels 210 and 220.

The channel control unit 110, in the apparatus for avoiding a collision between each of the RFID readers, receives a frequency channel usage request from an RFID reader from among the first RFID readers 151, 152, 153, and 154. If the channel control unit 110 allows the RFID reader to use one of the first and second adjacent frequency channels 210 and 220, the channel control unit 110 transmits an instruction message instructing the RFID reader to adjust a maximum output of the RFID reader to $P_2$ or $P_t$, while transmitting a usage allowance message to the RFID reader. The RFID reader, which has received the instruction message regarding adjusting the maximum output, adjusts the maximum output of the RFID reader itself by using the variable attenuator included therein, according to the received instruction message.

There is a high possibility that interference, i.e., a collision, between each of the RFID readers using adjacent frequency channels 205, 210, and 220 may be caused between each of the adjacent frequency channels 205, 210, and 220. Thus, in the case where the second RFID reader 164 uses a frequency channel 205, which belongs to the second frequency channels and is from among the adjacent frequency channels 205, 210, and 220, the first RFID reader 151 uses the first adjacent frequency channel 210, and the first RFID reader 152 uses the second adjacent frequency channel 220, an interference with respect to the second RFID reader 164 due to an output of the first RFID reader 151 or an output of the first RFID reader 152 may be decreased by respectively reducing the output of the first RFID reader 151 down to $P_2$ and the output of the first RFID reader 152 down to $P_t$.

The variable attenuator is a component that is installed in an RFID reader so as to adjust a degree of an output from the RFID reader.

Figure 3A:
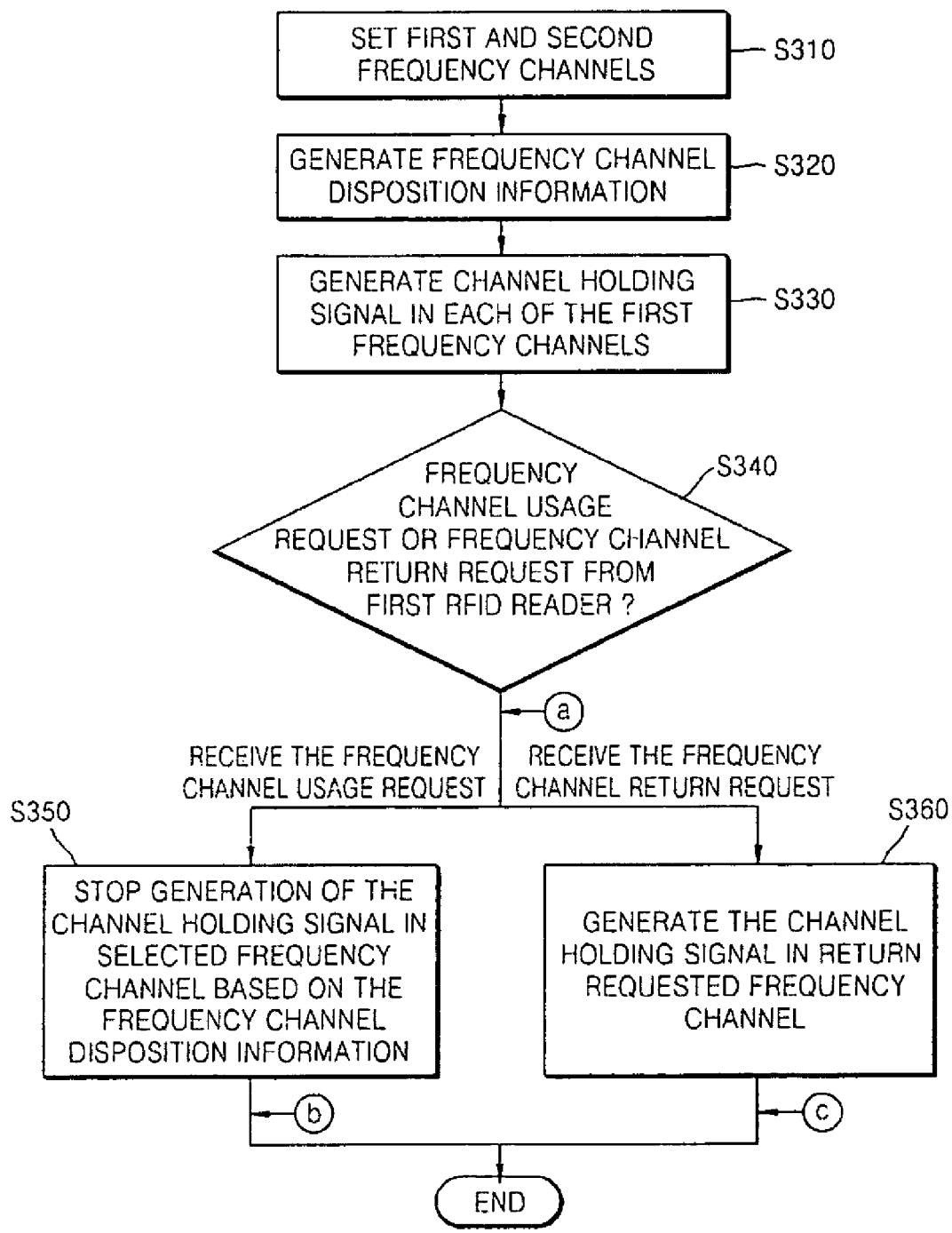
FIG. 3A is a flowchart of a method of avoiding a collision between each of the RFID readers, wherein the method is performed in the apparatus of FIG. 1, according to an embodiment of the present invention.

FIG. 3A is a flowchart of a method of avoiding a collision between each of the RFID readers, wherein the method is performed in the apparatus of FIG. 1, according to an embodiment of the present invention.

Each operation in FIG. 3A may be performed by using the channel control unit 110 or the channel holding unit 120, which are in the apparatus of FIG. 1, otherwise, may be performed by combining components included in the channel control unit 110 and the channel holding unit 120. Terms and technologies, which are not described in the method of avoiding a collision between each of the RFID readers in the flowchart of FIG. 3A, can be referred to in the description regarding the apparatus for avoiding a collision between each of the RFID readers of FIG. 1.

In operation S310, the RFID readers are divided into first RFID readers 151, 152, 153, and 154, and second RFID readers 161, 162, 163, and 164, according to a maximum output level. Then, first frequency channels to be used by the first RFID readers 151, 152, 153, and 154, and second frequency channels to be used by second RFID readers 161, 162, 163, and 164 are set.

In operation S320, frequency channel disposition information, which allocates at least one available frequency channel from among the first frequency channels to each of the first RFID readers 151, 152, 153, and 154 is set.

After the setting is completed, in operation S330, a channel holding signal is generated in each of the first frequency channels. That is, the channel holding signal is generated in each of the first frequency channels, thereby holding a corresponding first frequency channel. Also, a generation of the channel holding signal is stopped or the channel holding signal is not generated in each of the second frequency channels so that an OFF status is maintained, and thereby, releasing a corresponding second frequency channel.

In operation S340, when a request, regarding a frequency channel, is received from one of the first RFID readers 151, 152, 153, and 154, it is determined whether the received request is a usage request or a return request. That is, it is determined whether the request from one of the first RFID readers 151, 152, 153, and 154 is a frequency channel usage request requiring to use the frequency channel, or is a frequency channel return request requiring to stop using the frequency channel in use or to release a channel holding status.

If it is determined that the frequency channel usage request is received, in operation 340, the generation of the channel holding signal is stopped in a selected frequency channel, based on the frequency channel disposition information, in operation S350. This procedure is performed by the channel control unit 110 and the channel holding unit 120. The channel control unit 110 transmits an OFF control signal, thereby enables the channel holding unit 120 to stop generating the channel holding signal based on the received OFF_control signal.

Otherwise, if it is determined that the frequency channel return request is received, in operation 340, the channel holding signal is generated in a return requested frequency channel, in operation S360. This procedure is performed by the channel control unit 110 and the channel holding unit 120. The channel control unit 110 transmits an ON control signal, thereby enables the channel holding unit 120 to generate the channel holding signal based on the received ON control signal.

Figure 3B:
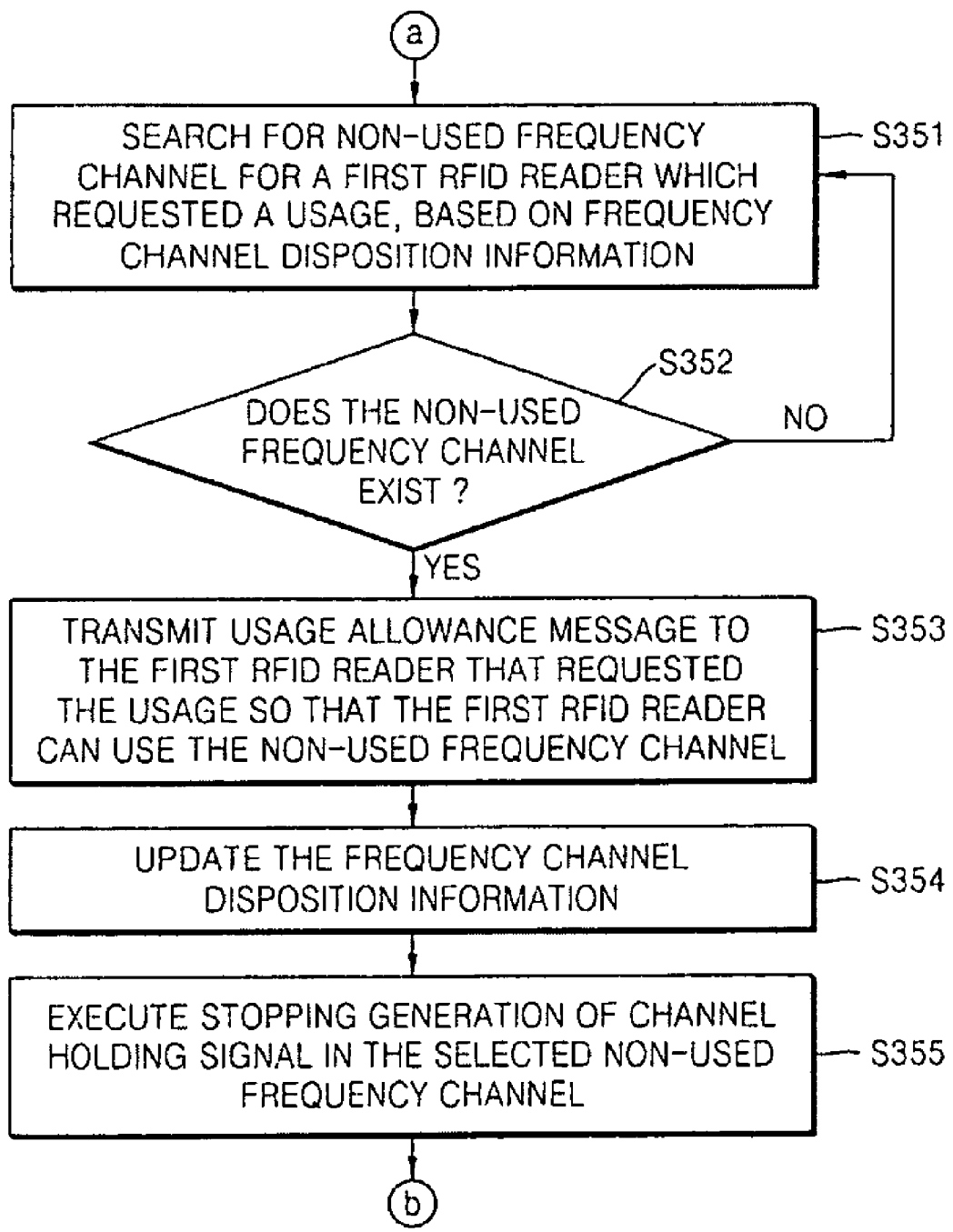
FIG. 3B is a detailed flowchart of an OFF operation from among operations of the method of FIG. 3A.

FIG. 3B is a detailed flowchart of an OFF operation (operation S350) from among operations of the method of FIG. 3A.

In operation S351, if the frequency channel usage request is received, a non-used frequency channel is searched for from among one or more available frequency channels allocated to the RFID reader that requested usage, based on the frequency channel disposition information.

If the non-used frequency channel does not exist, the search for the non-used frequency channel is repeated in operation S352.

If the non-used frequency channel is found, in operation S353, a usage allowance message is transmitted to the first RFID reader that requested the usage, thereby enabling the first RFID reader that requested the usage to select a non-used frequency channel from among a result of the search and to use the selected non-used frequency channel.

In operation S354, frequency channel disposition information is updated by considering that the selected non-used frequency channel is used. A time for such an update may be varied according to a user's policy. Thus, the update may be performed after operation S355 as described below.

In operation S355, the generation of the channel holding signal is stopped in the selected non-used frequency channel.

In this manner, the OFF operation (operation S350) is performed, thereby stopping the generating of the channel holding signal in a frequency channel to be used by the first RFID reader that requested the usage.

FIG. 3C is a detailed flowchart of an ON operation (operation S360) from among operations of the method of FIG. 3A.

In operation S361, when the frequency channel return request is received from a first RFID reader, the channel holding signal is immediately generated in the return requested frequency channel.

In operation S362, a return allowance message is transmitted to the first RFID reader that requested the return, thereby enabling the first RFID reader that requested the return to return the return requested frequency channel.

In operation S363, frequency channel disposition information is updated by considering that the return requested frequency channel is not used.

In this manner, the ON operation (operation S360) is performed, thereby generating the channel holding signal in a frequency channel to be returned by the first RFID reader that requested the return.

Figure 4A:
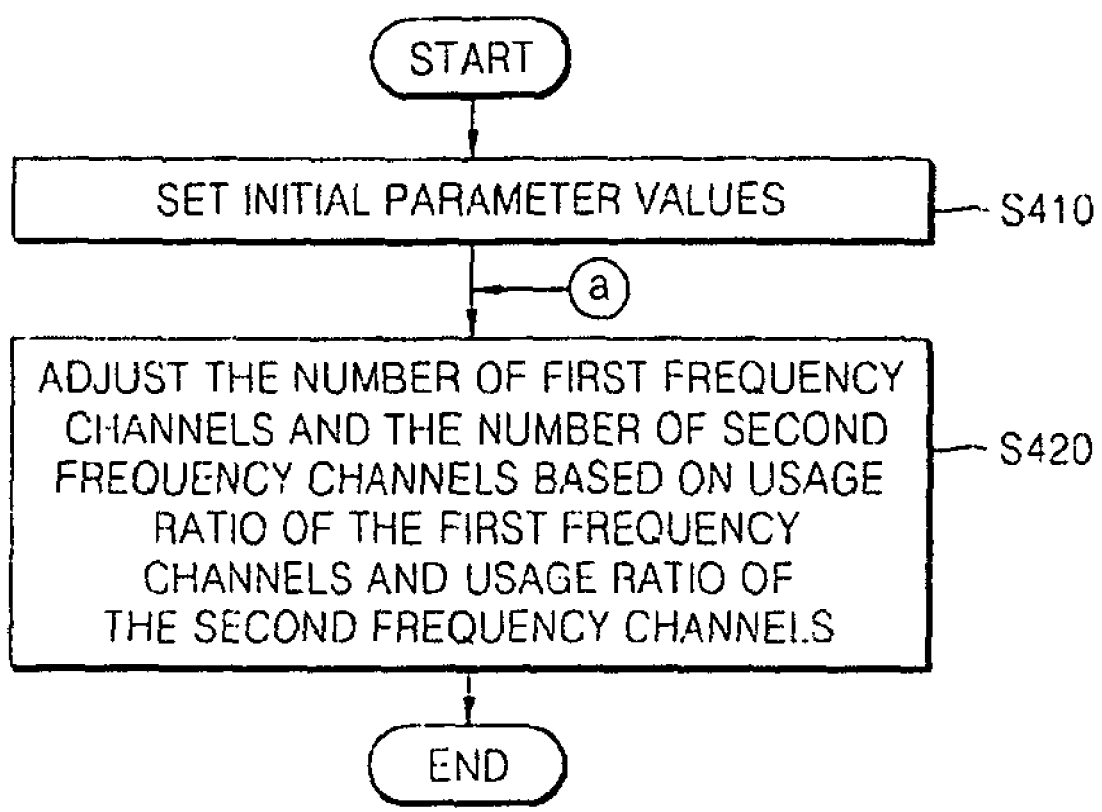
FIG. 4A is a flowchart of a method of controlling a ratio of the number of frequency channels respectively allocated to first RFID readers and second RFID readers that are divided according to an output, according to an embodiment of the present invention.

FIG. 4A is a flowchart of a method of controlling a ratio of the number of frequency channels respectively allocated to first RFID readers and second RFID readers that are divided according to an output, according to an embodiment of the present invention.

The method of controlling the ratio of the number of the frequency channels respectively allocated to the first RFID readers 151, 152, 153, and 154, and the second RFID readers 161, 162, 163, and 164, as illustrated in FIG. 4A, may be performed by the channel control unit 110 included in the apparatus for avoiding a collision between each of the RFID readers, and in this case, a result of controlling the ratio of the number of the frequency channels is reflected to the channel holding unit 120.

In operation S410, that is an initializing operation, initial parameter values are set. That is, a ratio (CH_RATIO) of the number of first frequency channels to be used by the first RFID readers 151, 152, 153, and 154 and the number of second frequency channels to be used by the second readers 161, 162, 163, and 164 is set. The number of minimum first frequency channels (MIN_1CH), which is an adjustable minimum value of the number of the first frequency channels, is set. The number of minimum second frequency channels (MIN_2CH), which is an adjustable minimum value of the number of the second frequency channels, is set. A minimum waiting time (X) is set, wherein the minimum waiting time (X) is a time required for allocating additional channels to the first RFID readers 151, 152, 153, and 154 since the first RFID readers 151, 152, 153, and 154 need to use more first frequency channels, and the first frequency channels have to remain used over a predetermined first ratio, e.g., up to 100%, during the minimum waiting time. That is, the minimum waiting time (X) means the time during which a usage ratio of the first frequency channels has to be maintained over the predetermined first ratio, so as to increase the number of the first frequency channels, wherein the usage ratio is a ratio of frequency channels that are from among the first frequency channels and which are used by the first RFID readers 151, 152, 153, and 154. Also, a saturated usage time, during which the usage ratio of the first frequency channels is maintained over the predetermined first ratio until the usage ratio is measured, is initialized.

In addition, the predetermined first ratio and a predetermined second ratio, as described later, may be arbitrarily determined by one skilled in the art performing the present invention. Also, the predetermined first and second ratios may be set in the initializing operation so as to be used in next operations. In a following description, the predetermined first and second ratios mean 100%.

In operation 420, based on the usage ratio of the first frequency channels and a usage ratio of the second frequency channels, which is a ratio of frequency channels from among the second frequency channels that are used by the second RFID readers 161, 162, 163, and 164, in other words, based on a result of checking of whether the first and second frequency channels are insufficient or sufficient, the number of current first and second frequency channels is adjusted. If the first and second frequency channels are sufficient, a channel disposition ratio, that is, the number of the first and second frequency channels is not changed.

Figure 4B:
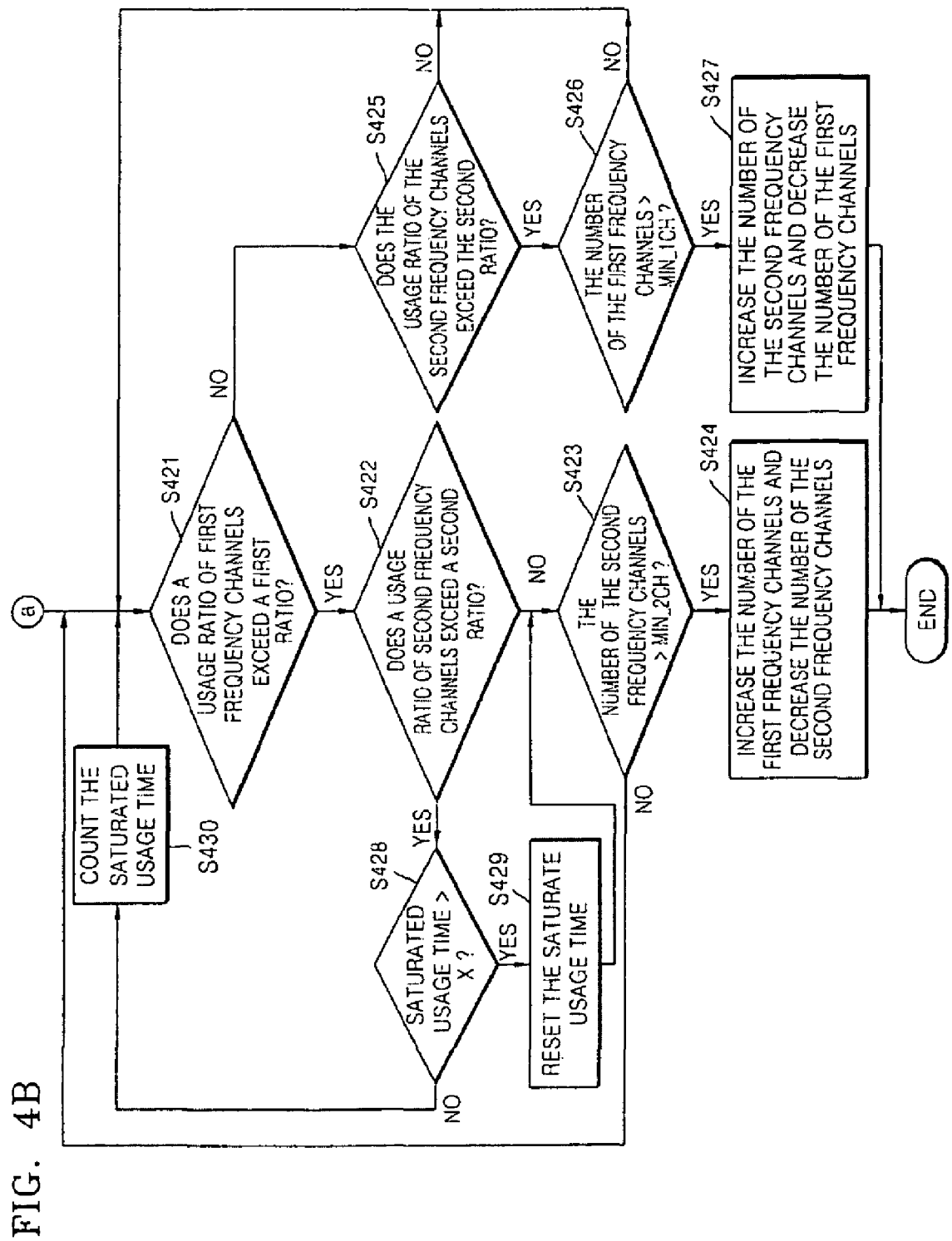
FIG. 4B is a detailed flowchart of an operation, for adjusting the number of frequency channels included in the method of FIG. 4A.

FIG. 4B is a detailed flowchart of operation S420, for adjusting the number of frequency channels, of the method of FIG. 4A.

If the usage ratio of the first frequency channels is determined to be over the predetermined first ratio, in operation 421, whether the usage ratio of the second frequency channels is over the predetermined second ratio is determined, in operation 422.

If the usage ratio of the second frequency channels is below the predetermined second ratio, in other words, when the second frequency channels are sufficient, in operation 422, it is determined whether the number of the current second frequency channels is greater than the minimum second frequency channels (MIN_2CH), in operation 423.

If the number of the current second frequency channels is greater than the number of the minimum second frequency channels (MIN_2CH), in operation 423, the number of the first frequency channels is increased and the number of the second frequency channels is decreased, in operation 424.

If the usage ratio of the first frequency channels is below the predetermined first ratio, in operation 421, it is determined whether the usage ratio of the second frequency channels is over the predetermined second percentage, in operation 425, in other words, it is determined whether the second frequency channels are insufficient.

If it is determined that the first frequency channels are sufficient and the second frequency channels are insufficient, in operation 425, it is determined whether the number of the current first frequency channels is greater than the number of the minimum first frequency channels (MIN_1CH), in operation 426.

In operation 426, if the number of the current first frequency channels is greater than the number of the minimum first frequency channels (MIN_1CH), the number of the second frequency channels is increased and the number of the first frequency channels is decreased, in operation 427.

If it is determined that the usage ratio of the first frequency channels is over the predetermined first ratio, in operation 421, and if it is determined that the usage ratio of the second frequency channels is over the predetermined second ratio, in operation 422, in other words, if all of the first and second frequency channels are insufficient, a priority is granted to the first frequency channels so that the first frequency channels are determined to be greatly insufficient.

After that, it is determined whether the saturated usage time, which is a time during which the first frequency channels remain insufficient, exceeds the minimum waiting time (X), in operation 428. If the saturated usage time exceeds the minimum waiting time (X), in operation 428, the saturated usage time is reset, in operation 429, so as to increase the number of the first frequency channels and decrease the number of the second frequency channels in operations 423 and 424.

If it is determined that the saturated usage time does not exceed the minimum waiting time (X), in operation 428, a saturated usage time, which is a waiting time for allocating an additional channel, is counted and accumulated, in operation 430.

Operation S420, for adjusting the number of the first and second frequency channels, may be performed when a frequency channel usage request is received from any one of the first RFID readers 151, 152, 153, and 154, or from any one of the second RFID readers 161, 162, 163, and 164.

The present invention can primarily allocate the frequency channel to important RFID readers by using the channel holding signal, and can control the ratio of the number of the frequency channels for the second RFID readers and the first RFID readers, in particular, for the mobile/handheld type RFID readers and the general type RFID readers.

That is, when the first RFID reader does not use a corresponding frequency channel, the channel holding unit generates the channel holding signal in the corresponding frequency channel so as to hold the corresponding frequency channel. Thus, the second RFID reader cannot arbitrarily use the corresponding frequency channel. Also, when an important RFID reader requests to use a frequency channel, the channel control unit can primarily allow the important RFID reader to use the frequency channel and allocate the frequency channel.

According to the present invention, the frequency channels for the first RFID readers and the frequency channels for the second RFID readers are divided and grouped, thus, interference, which is caused from an output of the first RFID readers and which affects the second RFID readers, such as the mobile/handheld type RFID readers, can be reduced.

Also, the conventional invention randomly allocates a frequency channel so that it is difficult to minimize a collision between each of the RFID readers. However, the present invention can use the frequency channel disposition information and allocate the frequency channel according to a request of the first RFID readers, such as the general type RFID readers, so that frequency channels, which are separated from each other as far as possible, are to be allocated to the first RFID readers that are adjacent to each other, thereby minimizing interference between each of the first RFID readers. In this manner, the present invention can reduce the collision between each of the RFID readers more than the conventional invention.

What is claimed is:

1. A method of avoiding a collision between each of RFID (radio frequency identification) readers communicating with a RFID tag via limited frequency channels, performed by an apparatus for avoiding a collision between each of RFID readers, the apparatus being wire-connected or wireless-connected to the RFID readers and comprising a channel control unit and a channel holding unit, the method comprising:

dividing, in a management information unit of the channel control unit, the RFID readers into first RFID readers and second RFID readers according to a maximum output level, and setting first frequency channels to be used by the first RFID readers and second frequency channels to be used by the second RFID readers;

setting frequency channel disposition information, in the management information unit, which allocates one or more available frequency channels from among the first frequency channels to each of the first RFID readers;

generating a channel holding signal, in a control unit of the channel control unit, which limits a usage by the second RFID readers, in each of the first frequency channels;

stopping a generation of the channel holding signal, in the control unit, in a selected frequency channel based on the frequency channel disposition information when a frequency channel usage request is received from one of the first RFID readers; and generating the channel holding signal, in the control unit, in a return requested frequency channel when a frequency channel return request is received from one of the first RFID readers.

2. The method of claim 1, further comprising:

waiting to receive one of a frequency channel usage request and a frequency channel return request from one of the first RFID readers; and repeating, in the control unit, the stopping and the generating if one of the frequency channel usage request and the frequency channel return request is received.

3. The method of claim 1, wherein the stopping comprises:

searching, in a search unit of the control unit, for a non-used frequency channel from among the one or more of the available frequency channels allocated to the first RFID reader that requested the usage, based on the frequency channel disposition information, if the frequency channel usage request is received;

transmitting a usage allowance message from the search unit to the first RFID reader that requested the usage, thereby enabling the first RFID reader that requested the usage to use a selected non-used frequency channel from among a result of the searching; and stopping the generation of the channel holding signal in the selected non-used frequency channel.

4. The method of claim 1, wherein the generating comprises:

executing, in an execution unit of the channel holding unit, a generation of the channel holding signal in the return requested frequency channel if the frequency channel return request is received; and transmitting a return allowance message from a report unit of the channel control unit to the first RFID reader that requested the return, thereby enabling the first RFID reader that requested the return to return the return requested frequency channel.

5. The method of claim 3, further comprising repeating the searching for a non-used frequency channel if the non-used frequency channel, from among the one or more of the available frequency channels allocated to the first RFID reader that requested the usage, does not exist.

6. The method of claim 1, wherein the stopping and the generating comprise updating the frequency channel disposition information according to a change of a usage status of the first frequency channels.

7. The method of claim 1, wherein the setting of the frequency channel disposition information comprises allocating frequency channels, which are separated from each other as far as possible from among the first frequency channels, to the first RFID readers that are adjacent to each other from among the first RFID readers, thereby minimizing the collision between each of the first RFID readers.

8. The method of claim 1, wherein the channel holding signal is a dummy signal.

9. The method of claim 1, wherein the first RFID readers are general type RFID readers of which positions are fixed and the second RFID readers are mobile/handheld type RFID readers.

10. The method of claim 1, wherein RFID readers, which use a first adjacent frequency channel that is from among the first frequency channels and most adjacent to the second frequency channels, generate a maximum output equal to a maximum output of the second RFID readers, and wherein RFID readers, which use a second adjacent frequency channel that is from among the first frequency channels and second-most adjacent to the second frequency channels, generate an output having a value which is between the maximum output of the second RFID readers and a maximum output of the first RFID readers.

11. An apparatus for avoiding a collision between each of RFID (radio frequency identification) readers communicating with a RFID tag via limited frequency channels, the apparatus comprising a channel control unit and a channel holding unit, wherein the channel control unit comprises:

a management information unit dividing the RFID readers into first RFID readers and second RFID readers according to a maximum output level, setting first frequency channels to be used by the first RFID readers and second frequency channels to be used by the second RFID readers, and setting frequency channel disposition information, which allocates one or more of the available frequency channels from among the first frequency channels to each of the first RFID readers;

an OFF control unit transmitting an OFF control signal for stopping generation of a channel holding signal in a selected frequency channel, based on the frequency channel disposition information, when a frequency channel usage request is received from one of the first RFID readers; and an ON control unit transmitting an ON control signal for generating the channel holding signal in a return requested frequency channel when a frequency channel return request is received from one of the first RFID readers, and wherein the channel holding unit generates the channel holding signal in each of the first frequency channels when the frequency channel disposition information is generated, and stops or generates the channel holding signal, based on a control signal received from the channel control unit.

12. The apparatus of claim 11, wherein the OFF control unit comprises:

a search unit searching for a non-used frequency channel from among the one or more of the available frequency channels allocated to the first RFID reader that requested the usage, based on the frequency channel disposition information, when the frequency channel usage request is received;

a usage allowance unit transmitting a usage allowance message to the first RFID reader that requested the usage, thereby enabling the first RFID reader that requested the usage to use a selected non-used frequency channel from among a result of the searching; and an OFF decision unit generating an OFF control signal for stopping the generating of the channel holding signal in the selected non-used frequency channel, wherein the channel holding unit comprises:
a receiving unit receiving a control signal from the channel control unit;
a flicker execution unit executing a stoppage of a generation of the channel holding signal or generation of the channel holding signal, based on the control signal received by the receiving unit; and
a report unit reporting a result of the execution, related to the stoppage of the generation of the channel holding signal or the generation of the channel holding signal that are executed by the flicker execution unit, to the channel control unit, and
wherein the ON control unit comprises:
an ON decision unit transmitting an ON control signal for generating the channel holding signal in the return requested frequency channel when the frequency channel return request is received; and
a return allowance unit transmitting a return allowance message to the first RFID reader which requested the return, thereby enabling the first RFID reader that requested the return to return the return requested frequency channel, when it is determined by the report unit that the channel holding signal has been generated in the return requested frequency channel.

13. The apparatus of claim 12, wherein the search unit repeats the searching for a non-used frequency channel when the non-used frequency channel, from among the one or more of the available frequency channels allocated to the first RFID reader that requested the usage, does not exist.

14. The apparatus of claim 11, wherein the channel control unit further comprises a frequency channel disposition information updating unit updating the frequency channel disposition information according to a change of a usage status of the first frequency channels.

15. The apparatus of claim 11, wherein the management information unit allocates frequency channels, which are separated from each other as far as possible from among the first frequency channels, to the first RFID readers which are adjacent to each other from among the first RFID readers, thereby minimizing the collision between each of the first RFID readers.

16. The apparatus of claim 11, wherein RFID readers, which use a first adjacent frequency channel that is from among the first frequency channels and most adjacent to the second frequency channels, generate a maximum output equal to a maximum output of the second RFID readers, and
wherein RFID readers, which use a second adjacent frequency channel that is from among the first frequency channels and second-most adjacent to the second frequency channels, generate an output having a value which is between the maximum output of the second RFID readers and a maximum output of the first RFID readers.

17. The apparatus of claim 16, wherein the RFID readers using the first adjacent frequency channel and the RFID readers using the second adjacent frequency channel comprise a variable attenuator.

18. A method of controlling a ratio of the number of first frequency channels and second frequency channels which are respectively to be used by first RFID (radio frequency identification) readers and second RFID readers that are divided from RFID readers according to a maximum output level, performed by an apparatus for avoiding a collision between each of RFID readers communicating with a RFID tag via limited frequency channels, the apparatus being wire-connected or wireless-connected to the RFID readers and comprising a channel control unit, the method comprising:

setting initial parameter values, in the channel control unit, comprising a ratio of the number of the first frequency channels and the number of the second frequency channels; and adjusting, in the channel control unit, the number of the first frequency channels and the number of the second frequency channels based on a usage ratio of the first frequency channels and a usage ratio of the second frequency channels, wherein the usage ratio of the first frequency channels is a ratio of the number of the first frequency channels to the number of frequency channels actually used by the first RFID readers, and the usage ratio of the second frequency channels is a ratio of the number of the second frequency channels to the number of frequency channels actually used by the second RFID readers.

19. The method of claim 18, wherein the adjusting comprises:
increasing the number of the first frequency channels and decreasing the number of the second frequency channels if the usage ratio of the first frequency channels is over a predetermined first ratio and the usage ratio of the second frequency channels is below a predetermined second ratio; and
increasing the number of the second frequency channels and decreasing the number of the first frequency channels if the usage ratio of the second frequency channels is over the predetermined second ratio and the usage ratio of the first frequency channels is below the predetermined first ratio.

20. The method of claim 19, wherein the predetermined first and second ratios are 100%.

21. The method of claim 19, wherein the initial parameter values further comprise the number of minimum first frequency channels, which is an adjustable minimum value of the number of the first frequency channels, and the number of minimum second frequency channels, which is an adjustable minimum value of the number of the second frequency channels, and
wherein the increasing of the number of the first frequency channels and the decreasing of the number of the second frequency channels are performed only if the number of the second frequency channels is greater than the number of the minimum second frequency channels, and the increasing of the number of the second frequency channels and the decreasing of the number of the first frequency channels are performed only if the number of the first frequency channels is greater than the number of the minimum first frequency channels.

22. The method of claim 18, wherein the initial parameter values comprise a minimum waiting time during which the usage ratio of the first frequency channels has to be maintained over the predetermined first ratio for increasing the number of the first frequency channels,
wherein the adjusting comprises:
if the usage ratio of the first frequency channels is over the predetermined first ratio and the usage ratio of the second frequency channels is over the predetermined second ratio, determining whether a saturated usage time, during which the usage ratio of the first frequency channels is maintained over the predetermined first ratio exceeds the minimum waiting time;

if the saturated usage time does not exceed the minimum waiting time, continuously counting the saturated usage time and repeating the determining of whether the saturated usage time exceeds the minimum waiting time;

if the saturated usage time exceeds the minimum waiting time, determining whether the number of the second frequency channels is greater than the number of the minimum second frequency channels; and if the number of the second frequency channels is greater than the number of the minimum second frequency channels, increasing the number of the first frequency channels and decreasing the number of the second frequency channels.

23. The method of claim 22, wherein the adjusting is performed if a frequency channel usage request is received from one of the first RFID readers or one of the second RFID readers.

24. The method of claim 22, further comprising initializing the saturated usage time if the saturated usage time exceeds the minimum waiting time.

25. The method of claim 18, wherein the adjusting is periodically performed.

* * * * *